United States Patent
Morrell et al.

(10) Patent No.: US 6,615,938 B2
(45) Date of Patent: Sep. 9, 2003

(54) MECHANISM FOR STAIR CLIMBING IN A CLUSTER-WHEEL VEHICLE

(75) Inventors: John B. Morrell, Manchester, NH (US); John M. Kerwin, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/234,025

(22) Filed: Sep. 3, 2002

(65) Prior Publication Data

US 2003/0111279 A1 Jun. 19, 2003

Related U.S. Application Data

(60) Continuation of application No. 10/051,333, filed on Jan. 18, 2002, now Pat. No. 6,443,251, which is a continuation of application No. 09/757,230, filed on Jan. 9, 2001, now Pat. No. 6,343,664, which is a division of application No. 09/428,007, filed on Oct. 27, 1999, now Pat. No. 6,311,794
(60) Provisional application No. 60/124,403, filed on Mar. 15, 1999.

(51) Int. Cl.[7] ............................................. B62D 61/12
(52) U.S. Cl. ....................................... 180/8.2; 180/65.8
(58) Field of Search .......................... 180/8.1, 8.2, 8.3, 180/65.1, 65.8; 701/36, 37, 38, 48, 65

(56) References Cited

U.S. PATENT DOCUMENTS

| | | | | |
|---|---|---|---|---|
| 2,742,973 A | * | 4/1956 | Johannesen | 180/8.2 |
| 3,145,797 A | * | 8/1964 | Taylor | 180/209 |
| 3,260,324 A | * | 7/1966 | Suarez | 180/10 |
| 3,288,234 A | * | 11/1966 | Feliz | 180/6.5 |
| 3,348,518 A | * | 10/1967 | Forsyth et al. | 440/12.66 |
| 3,374,845 A | * | 3/1968 | Selwyn | 180/6.5 |
| 3,399,742 A | * | 9/1968 | Malick | 180/21 |
| 3,580,344 A | * | 5/1971 | Floyd | 180/8.2 |
| 4,088,199 A | * | 5/1978 | Trautwein | 180/209 |
| 4,109,741 A | * | 8/1978 | Gabriel | 180/21 |
| 4,222,449 A | * | 9/1980 | Feliz | 180/8.2 |
| 4,354,569 A | * | 10/1982 | Eichholz | 180/211 |
| 4,375,840 A | * | 3/1983 | Campbell | 180/6.5 |
| 4,512,588 A | * | 4/1985 | Cox | 280/5.26 |
| 4,566,707 A | * | 1/1986 | Nitzberg | 180/8.2 |
| 4,624,469 A | * | 11/1986 | Bourne, Jr. | 280/62 |
| 4,657,272 A | * | 4/1987 | Davenport | 280/266 |
| 4,709,772 A | * | 12/1987 | Brunet | 180/8.2 |
| 4,790,548 A | * | 12/1988 | Decelles et al. | 280/5.26 |
| 4,794,999 A | * | 1/1989 | Hester | 180/8.2 |
| 4,802,542 A | * | 2/1989 | Houston et al. | 180/65.5 |
| 4,809,804 A | * | 3/1989 | Houston et al. | 180/65.5 |
| 4,874,055 A | * | 10/1989 | Beer | 180/19.2 |
| 4,998,596 A | * | 3/1991 | Miksitz | 180/213 |
| 5,111,899 A | * | 5/1992 | Reimann | 180/65.1 |
| 5,248,007 A | * | 9/1993 | Watkins et al. | 180/9.32 |
| 5,314,034 A | * | 5/1994 | Chittal | 180/21 |
| 5,350,033 A | * | 9/1994 | Kraft | 180/167 |
| 5,366,036 A | * | 11/1994 | Perry | 180/65.1 |
| 5,701,965 A | * | 12/1997 | Kamen et al. | 180/7.1 |
| 5,791,425 A | * | 8/1998 | Kamen et al. | 180/7.1 |
| 5,794,730 A | * | 8/1998 | Kamen | 180/7.1 |
| 5,971,091 A | * | 10/1999 | Kamen et al. | 180/218 |
| 5,975,225 A | * | 11/1999 | Kamen et al. | 180/7.1 |
| 6,003,624 A | * | 12/1999 | Jorgensen et al. | 180/6.5 |

* cited by examiner

*Primary Examiner*—Kevin Hurley
(74) *Attorney, Agent, or Firm*—Bromberg & Sunstein LLP

(57) ABSTRACT

A method for operating a device ascending or descending stairs. The device has a plurality of wheels rotatable about axes that are fixed with respect to a cluster arm, where the cluster arm itself is rotated about an axis so that wheels rest on successive stairs. The wheels and cluster arms are controlled according to separate control laws by a controller. Whether the device ascends or descends the stairs is governed by the pitch of the device relative to specified front and rear angles.

2 Claims, 7 Drawing Sheets

MECHANISM FOR STAIR CLIMBING IN A CLUSTER-WHEEL VEHICLE

The present applications continuation application of Ser. No. 10/051,333, filed Jan. 18, 2002 now U.S. Pat. No. 6,443,251, which is a continuation application of Ser. No. 09/757,230, filed Jan. 9, 2001 now U.S. Pat. No. 6,343,664, which is a divisional application of Ser. No. 09/428,007, filed Oct. 27, 1999 now U.S. Pat. No. 6,311,794. This application claims priority from U.S. Provisional Application, Ser. No. 60/124,403, filed Mar. 15, 1999. These applications are hereby incorporated herein by reference.

TECHNICAL FIELD

The present invention pertains to methods for controlling the configuration and motion of a personal vehicle equipped with one or more wheels or other ground-contacting members.

BACKGROUND OF THE INVENTION

Personal vehicles (those used by handicapped persons, for example), may benefit from actively stabilization in one or more of the fore-aft or left-right planes. Operation of a balancing vehicle is described in U.S. Pat. No. 5,701,965 (incorporated herein by reference, and referred to herein as the "'965 patent"). Personal vehicles may advantageously be stabilized whether or not the vehicles are self-propelled, whether or not the vehicles may be guided by the occupant of the vehicle or by an assistant, and whether or not the vehicles may operate in a balancing mode. Vehicles of this sort may be more efficiently and safely operated employing control modes supplementary to those described in the prior art. A personal vehicle may be referred to in this description, interchangeably, as a "transporter."

SUMMARY OF THE INVENTION

In accordance with a preferred embodiment of the invention, terms are provided in both the wheel and cluster control laws of a vehicle so that the amount of effort required by a rider to control the vehicle by virtue of the location of the center of gravity is significantly reduced. Thus, most riders are able to climb or descend stairs unaided by an assistant. The addition of terms referenced to a front and rear angle allows the rider to lean the vehicle between the front and rear angle with relatively low exertions because the pitch gain can be set to a small value while a large gain can be used with the front and rear angles to maintain a fast rotation of the cluster during stair climbing. The front and rear angles are updated throughout the stair climbing process thereby allowing the rider to vary the position of the vehicle CG (center of gravity) with very little effort.

In accordance with embodiments of the invention, a wheel control law is provided that mirrors the cluster control law in that front and rear angles are added to the wheel control law. The wheel control law differs slightly from the cluster control law in order to assure that during stair climbing the wheels can only move in the rearward direction. In addition, a damping term is included in the wheel control law which changes depending on the wheel direction and has the effect of accelerating the wheel into the riser while decelerating the wheels in the forward direction. This change alters the behavior of the vehicle at the top or bottom step and provides for a safer transition at the beginning and end of stair climbing.

In accordance with further embodiments of the invention, there is provided a brake pitch control algorithm. This is a safety feature that monitors the cluster and wheel motor temperature during stair climbing. If the cluster or wheel motor overheats and fails during portions of the stair climb, the vehicle may fall. If the temperature exceeds a preset value, the brake pitch controller turns off the motor amplifiers and controls the motion by modulating the cluster brakes. The controller places the vehicle in a configuration where all four wheels are on the stairs thus placing the vehicle in a statically stable configuration with respect to gravity and preventing the rider from continuing in stair mode. The algorithm continues to monitor the motor temperature and if the motors cool sufficiently, will resume stair mode in order to allow the rider to exit from the stairs.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

In accordance with preferred embodiments of the invention, personal vehicles designed for enhanced maneuverability and safety include one or more clusters of wheels, with the cluster and the wheels in each cluster capable of being motor-driven independently of each other.

Figure 1:
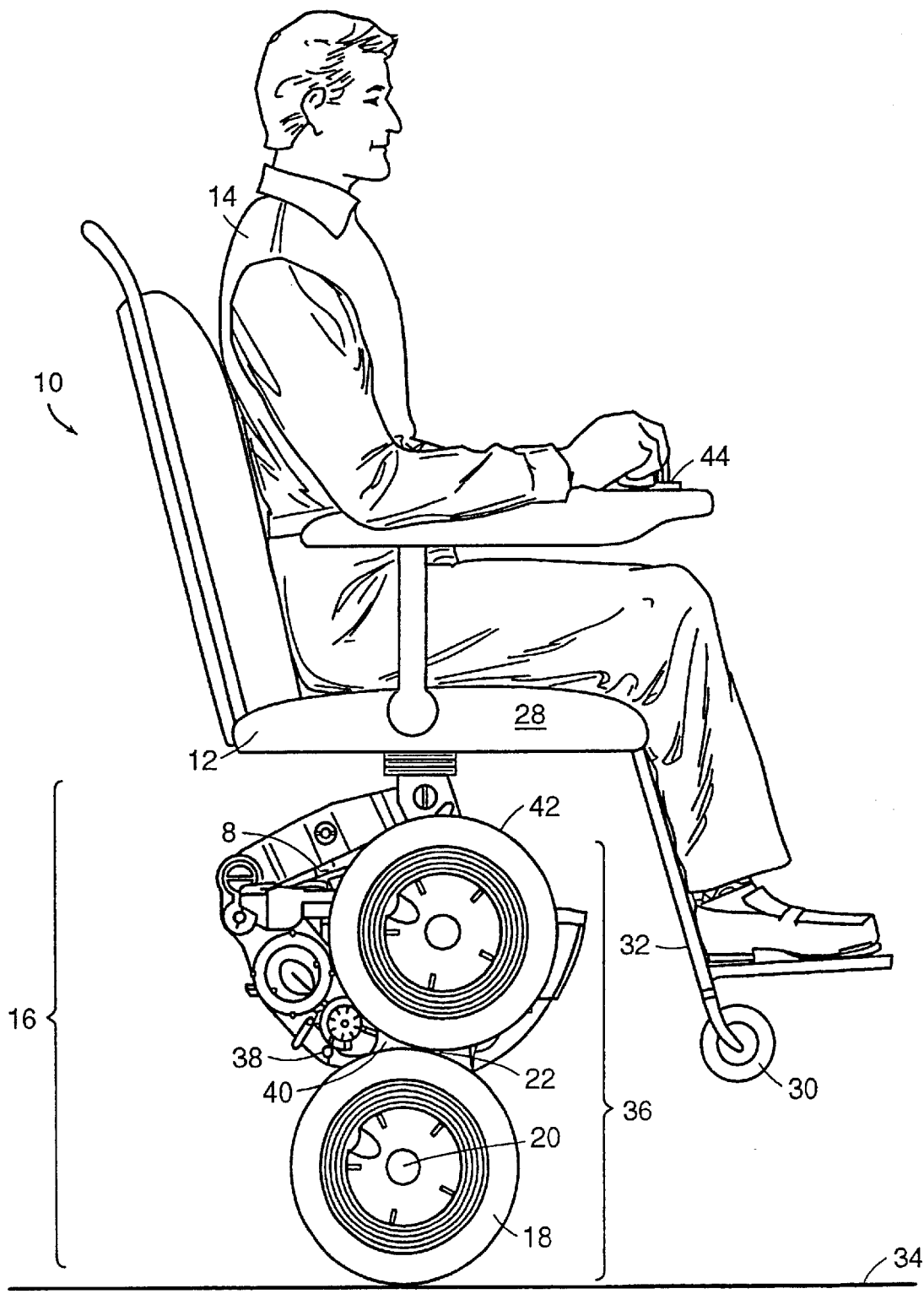
FIG. 1 is a side view of a prior art personal vehicle of the type in which an embodiment of the invention may be advantageously employed.

Referring to FIG. 1, a side view is shown of a balancing vehicle, such as otherwise described in U.S. Pat. No. 5,701,965, and as designated generally by numeral 10. Preferred embodiments of the present invention may advantageously be practiced in conjunction with balancing vehicle 10. FIG. 1 does not represent a prior art device when capable of operation in modes herein described and claimed in the appended claims.

Vehicle 10 has a support 12 that supports the rider 14 on the vehicle. Support 12 is attached to a ground-contacting module 16. Ground-contacting module 16 contains the power source, drive amplifiers, drive motors, and controller that are used to drive a cluster 36 of wheels 18. Cluster 36 includes ground-contacting elements 18 which are shown as wheels in FIG. 1. The wheels 18 are mounted on a cluster arm 40 and each wheel 18 is capable of being driven by controller 8. Cluster arm 40 rotates about a cluster axis 22, the rotation of the arm governed by the controller. Controller 8 comprises a processor in communication with a memory storage device. The processor executes a control program stored in the memory storage device. The processor is in communication with a plurality of sensors 38 capable of sensing the state of the vehicle and receiving commands from the rider 14. The processor is also in communication with the drive amplifiers and sends commands to the drive amplifiers. The drive amplifiers provide current to the drive motors.

As stated, controller 8 is capable of independently controlling cluster arm 40 and the rotating wheels 18. In addition, sensors 38 on the ground-contacting module 36 are capable of sensing the pitch, roll, and yaw of the vehicle 10 as well as such variables as the angular position and/or rate of rotation of wheels 18 and cluster arm 40. The signals from the sensors are communicated to the controller and are used by the controller to drive the wheel and the cluster motors. The independent control of the clusters and wheels allows the vehicle to operate in several modes thereby allowing the rider or the controller to switch between modes in response to the local terrain.

For example, in 'standard mode,' cluster 36 is rotated to lift the front wheel 14 of the cluster off the ground and is locked in place and the controller is placed in a simple PID loop to allow the vehicle to operate as a powered wheelchair. In 'balance mode,' cluster 36 is rotated 90°, locked in place, and the controller is allowed to balance and drive the vehicle by commands to the wheel motors. In 'enhanced mode,' described in U.S. application Ser. No. 09/321,401, filed on May 28, 1999 and herein incorporated by reference, controller 8 allows both the wheels 18 and clusters 36 to operate simultaneously.

In stair mode, vehicle 10 climbs and descends stairs by rotating the cluster 36 in such a manner as to place the second wheel 42 (i.e., the wheel not currently in ground contact) of each cluster onto the appropriate stair. During cluster rotation, the vehicle is supported by only one wheel 18 from each cluster and is unstable with respect to falling. In a manner unlike its operation in either 'balance' or 'enhanced' mode, controller 8 does not attempt to balance the vehicle. Instead, the rider 14 maintains balance by holding on to stair handrail (not shown). The handrail also provides the rider with a leverage point to lean the vehicle in the fore or aft direction in order to direct the vehicle to either climb or descend the stairs. The cluster control law used by controller 8 to operate the cluster motor has the same form as the control law for the wheel motors described in the '965 patent and may be represented as:

$$T_c = K_1 \theta + K_2 \dot{\theta} + K_3 \phi_c K_4 \dot{\phi}_c + K_5 \int \phi_c dt.$$

In the equation above, $T_c$ represents the cluster torque, $\theta$ represents the vehicle pitch error, $\phi_c$ represents the cluster angle error with respect to vertical, and the $K_i$ represent the gains for each dynamic variable. Pitch is defined with respect to an earth-fixed vertical direction, while error designates the difference between a currently measured value and a fiducial value that may be set by the controller, either by presetting or in real time. The cluster angle (otherwise referred to as the 'cluster position') with respect to vertical is a calculated value based in part on readings of sensors mounted to the mechanical structure (referred to as an 'E-box') which is fixed to the vehicle and contains controller 8. Alternatively, the cluster angle may be referred to the E-box itself, in which case the cluster angle with respect to the E-box is designated by $\delta$, and gains $K_3$ and $K_4$ are adjusted accordingly. The superscript dot indicates time differentiation of the dynamic variable. The first four terms have the same form as the control law for the wheels although gains are different for the wheel and cluster control laws. For example, the wheel control law sets $K_3$, corresponding to the wheel velocity to zero while the cluster control law sets $K_3$, corresponding to the cluster rotation rate to a non-zero value.

The fifth term in the cluster control law is used to ensure that the cluster goes to a specified angle with substantially no steady state error. For example, in balance mode, the cluster is rotated to 0° and locked in place. As the cluster is rotated, the angle error decreases and the rotation to the vertical orientation may stop before the cluster reaches 0°. In order to ensure that the cluster reaches 0°, the fifth term in the cluster controller law adds an additional component to the cluster motor command so that the cluster is able to achieve the specified orientation of 0°.

The control law as heretofore described will serve to operate the vehicle for ascending and descending stairs. In order to climb or descend stairs, rider 14 leans vehicle 10 in the forward direction to travel down the stairs or in the rearward direction to travel up the stairs. The rider accomplishes this by pushing off of or by pulling on the stair handrail. In cases where riders lack sufficient upper body strength to exert the requisite force on the handrail to cause the clusters to rotate the wheels to the next step, an assistant may help the rider lean the vehicle in the forward or rearward direction. Alternatively, the pitch gain, $K_1$, may be decreased. Decreasing $K_1$ has the effect of making the vehicle easier to lean into the stair thereby allowing the rider to lean the vehicle with a lower force on the handrail. However, a small $K_1$ also results in a slower rotation of the cluster during stair climbing thereby increasing the stair climbing time.

In accordance with preferred embodiments of the present invention, additional terms may be added to both the wheel and cluster control laws, as described below, providing the advantage that the effort required of the rider to lean the vehicle is significantly reduced. Thus, most riders are enabled to climb or descend stairs unaided by an assistant.

FIGS. 2a–2d illustrates the phases of stair assent and descent, collectively known as stair climbing. The present invention uses the same control modes for both assent and descent and does not require the rider to select the direction of stair travel thereby providing an additional safety factor by eliminating the possibility of an incorrect selection by the rider. For purposes of simplicity in the figure, only two wheels 210 and 212 attached to cluster arm 220 are shown. The rider and vehicle, denoted generally as 20, are represented by the center of gravity (CG) 230 of the rider and vehicle together. A line 240 is defined by the CG 230 and the cluster axis 250. The angle defined by the line 240 and a vertical line 252 with respect to gravity passing through the cluster axis 250 defines the vehicle pitch (frame pitch), $\theta$. The angle defined by cluster arm 220 and a vertical line with respect to gravity passing through the cluster axis 250 defines the cluster position (or 'cluster angle'), $\phi_c$.

Figure 2A:
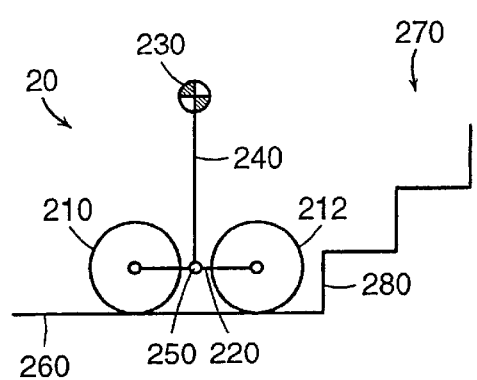
FIGS. 2a–2d illustrate the phases of a stair ascend/descend cycle.

FIG. 2a shows vehicle 20 on the bottom landing 260 of a flight of stairs 270. In typical stair mode operation, the rider faces away from the stairs. Thus, the direction facing away from the stairs will be referred to in the following description as the 'front' direction, while the direction facing into the stairs will be referred to as the 'rear' direction. The wheel 212 closest to the stair riser 280 is considered the rear wheel and the wheel 210 farthest from the stair riser 280 is considered to be the front wheel.

Figure 2B:
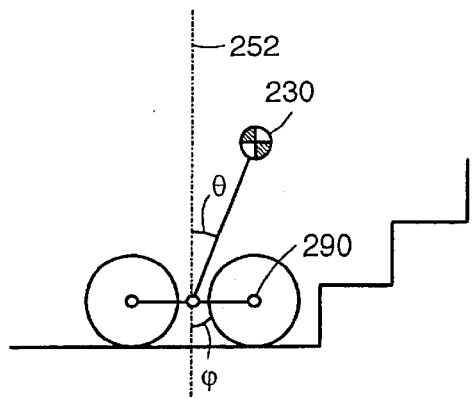
Figure 2C:
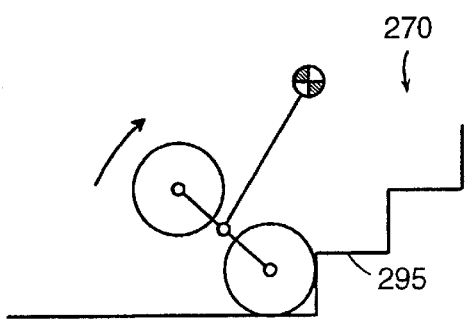

After the rider positions the vehicle on the bottom landing 260 as shown in FIG. 2a, the rider enters 'stair mode' by so instructing controller 8. The rider moves CG 230 to a position over the center 290 of the rear wheel 212 as shown in FIG. 2b. The rider may move the CG 230 by grasping and pulling on a handrail. Alternatively, CG 230 may be moved by an assistant tilting the rider and vehicle 20. In a preferred embodiment, the controller 8 (shown in FIG. 1) may alter the frame pitch for the rider. As the CG 230 moves behind the rear wheel center 290, the cluster arm rotates to lift the front wheel off of the landing 260 and onto the next step 295 as shown in FIG. 2c.

Figure 2D:
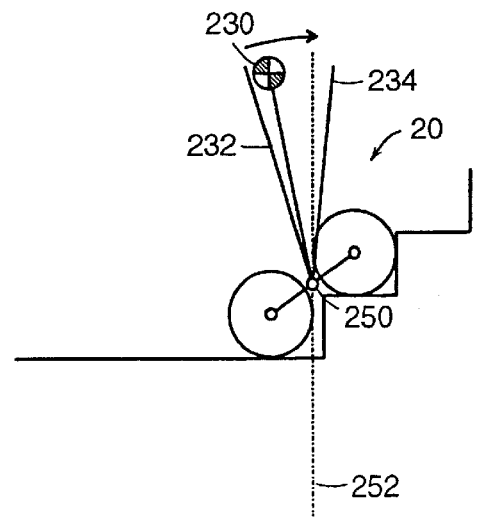

Referring now to FIG. 2d, the configuration of vehicle 20 is shown after the cluster motor (not shown) has rotated the front wheel onto the next step 295. If the rider decides to continue ascending the stairs 270, the rider moves the CG 230 beyond a specified line indicated by numeral 234. The angle defined by line 234 and a vertical with respect to gravity passing through the cluster axis 250 is defined as the rear angle, $\theta_{rear}$. The angle defined by line 232 and a vertical 252 with respect to gravity passing through the cluster axis 250 is defined as the front angle, $\theta_{front}$. The front and rear angles are more particularly described below with reference to FIG. 4 where they are shown explicitly.

If the rider decides to descend the stairs 270, the rider moves the CG 230 in front of the front angle, $\theta_{front}$. The controller automatically decides the direction of cluster rotation by comparing the measured pitch, $\theta$, to the front and rear angles. If $\theta > \theta_{front}$, the controller rotates the cluster in a counter-clockwise direction (with reference to FIG. 2d) and vehicle 20 will descend the stairs 270. If $\theta_{rear}$, the controller rotates the cluster in a clockwise direction (with reference to FIG. 2d) and the vehicle ascends the stairs 270.

Using the same controller for both upward and downward stair travel provides an important safety feature to the rider by preventing the rider from accidentally selecting the wrong stair travel direction.

Figure 3:
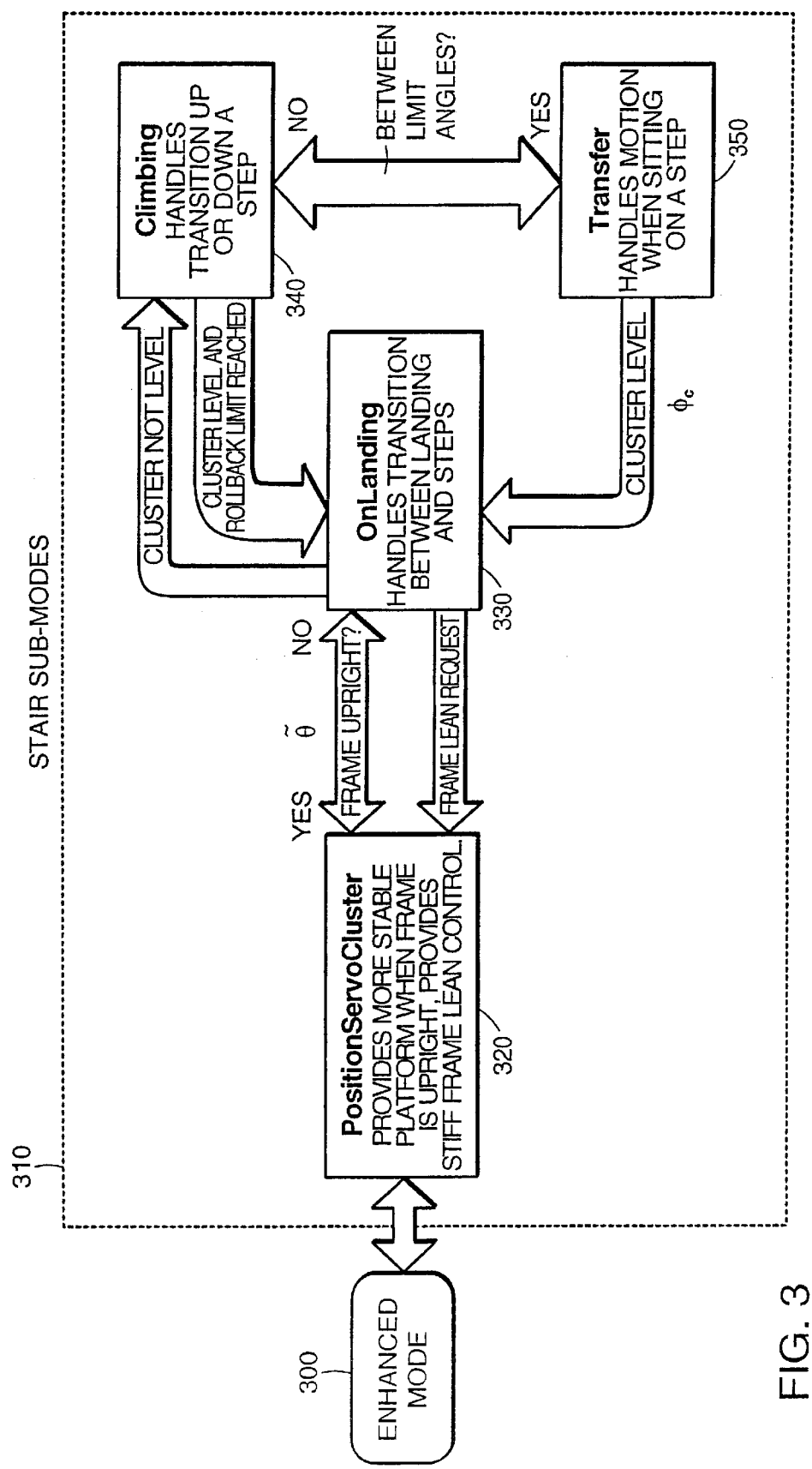
FIG. 3 shows a schematic block diagram of the sub-modes of the present invention.

FIG. 3 shows a schematic block diagram of the sub-modes for the stair mode. From enhanced mode 300 (which is described in U.S. Ser. No. 09/321,401), the rider selects stair mode 310. Each sub-mode is characterized by a set of gain coefficients that are combined with the system dynamic variables in a generalized control law. The generalized control law for the wheel motor (the wheel control law) and the cluster motor (the cluster control law) are shown in equations (1) and (2), respectively below.

$$V_w = k_{w\theta}(\theta'_{front} - \theta'_{rear}) - k_{w\theta r}|\theta| + k_{wd}\phi'_w + k_{wp}\phi'_w \quad (1)$$

$$V_c = k_\theta(\theta'_{front} + \theta'_{rear}) + k_{\theta r}\theta + k_d\delta' + k_p\delta' k_i \int \delta' dt \quad (2)$$

In the equations above, $V_w$ and $V_c$ are the commanded voltages for the wheel and cluster motors, respectively. The subscript w refers to the wheel variables, the subscript c refers to the cluster variables, the subscript r indicates the time derivative of the variable, as does a superscripted dot above the variable. The prime notation indicates an error variable, namely, the difference between the actual value of the variable and desired value of the variable. For example, the wheel position error, $\phi'_w$, is defined by the equation, $\phi'_w = \phi_{w\ desired} - \phi_w$ where $\phi_w$ represents the wheel position as determined by on-board sensors and $\phi_{w\ desired}$ represents the desired wheel position as calculated by the controller. The k's represent the gains for each variable. The pitch variable is represented by $\theta$, the wheel position by $\phi_w$, and the cluster position by $\delta$. Each sub-mode is characterized by the set of gains indicated in equations (1) and (2). The selection of the specific value for each gain will depend on factors such as the sub-mode objectives and rider comfort and can be determined by one of ordinary skill in the control arts without undue experimentation given the description of the sub-modes below.

Referring further to FIG. 3, stair mode 310 is entered from enhanced mode 300 by rider selection. The control laws for stair mode are very different than the control laws for 'enhanced mode' and does not provide the same disturbance rejection. In order to prevent such a situation, 'stair mode' 310 is entered through the sub-mode referred to as 'Position Servo Cluster' or 'PSC' 320. Sub-mode PSC 320 provides a stable platform when the vehicle is on level ground such as a stair landing. Stability on a stair landing is provided in the cluster control law by setting the pitch gains, $k_\theta$ and $k_{\theta r}$, to small values relative to the position gains, $k_d$, $k_p$, and $k_i$. The large position gains result in a stiff position control of the cluster position relative to the CG. A similar strategy is also implemented in the wheel control law by setting the wheel position gain, $k_{wp}$, to a large value relative to the other wheel gains. This has the effect of keeping the vehicle in place as the rider prepares to start stair climbing. The stiff position control of the cluster enables the rider to shift the CG over the rear wheel as shown in FIG. 2(b) by changing the desired cluster position, $\delta_{desired}$.

The desired cluster position is modified by the controller which processes the rider commands input via an input device such as a button or joystick 44 (shown in FIG. 1). As $\delta_{desired}$ is modified by the controller, $\delta'$ becomes non-zero and is multiplied by $k_p$ producing a non-zero voltage command to the cluster motor resulting in the rotation of the cluster relative to the CG and producing a configuration shown in FIG. 2(b). An equivalent view of FIG. 2(b) is that vehicle pitch, $\theta$, has been decreased from 0° to q. In this description, a convention is employed wherein a positive pitch angle corresponds to the vehicle leaning in the forward direction. The controller will detect the non-zero pitch state of the vehicle and automatically transition to the sub-mode 'OnLanding' 330. The transition between sub-modes is accomplished by replacing the gains associated with the exiting sub-mode with the gains associated with the entering sub-mode into the cluster and wheel control laws, as apparent to one of ordinary skill in the control arts. In a preferred embodiment of the present invention, the transition is accomplished by control scheduling as described in U.S. application Ser. No. 09/322,431 which is herein incorporated by reference.

In the OnLanding sub-mode 330, the controller allows the rider to control the cluster motor by varying the vehicle pitch, $\theta$. Additionally, the OnLanding sub-mode 330 allows the vehicle to roll freely in either the forward or rearward direction. OnLanding sub-mode 330 permits rider pitch control by setting the pitch gain, $k_\theta$, and the rate gains, $k_{\theta r}$ and $k_d$, to large values relative to the other cluster gains in the cluster control law. The large $k_\theta$ has the effect of making the cluster motor sensitive to small changes in the pitch of the vehicle. The rate gains act to provide a damping effect on the cluster motor and tends to smooth the motion of the vehicle while stair climbing.

The pitch error state variable associated with $k_\theta$, $(\theta'_{front} + \theta'_{rear})$ represents the angle the CG is in front of the front angle, $\theta_{front}$, or the angle the CG is behind the rear angle, $\theta_{rear}$. The pitch error state variable is a slightly more complicated function than the error variables defined in equations (1) and (2) and is now described in conjunction with the description of the front and rear angle.

The error state variables $\theta'_{front}$ and $\theta'_{rear}$ are two sided functions show below.

$$\theta'_{front} = \begin{cases} \theta_{front} - \theta & \text{for } \theta \geq \theta_{front} \\ 0 & \text{otherwise} \end{cases} \quad (3)$$

$$\theta'_{rear} = \begin{cases} 0 & \text{for } \theta \geq \theta_{rear} \\ \theta_{rear} - \theta & \text{otherwise} \end{cases} \quad (4)$$

Figure 4:
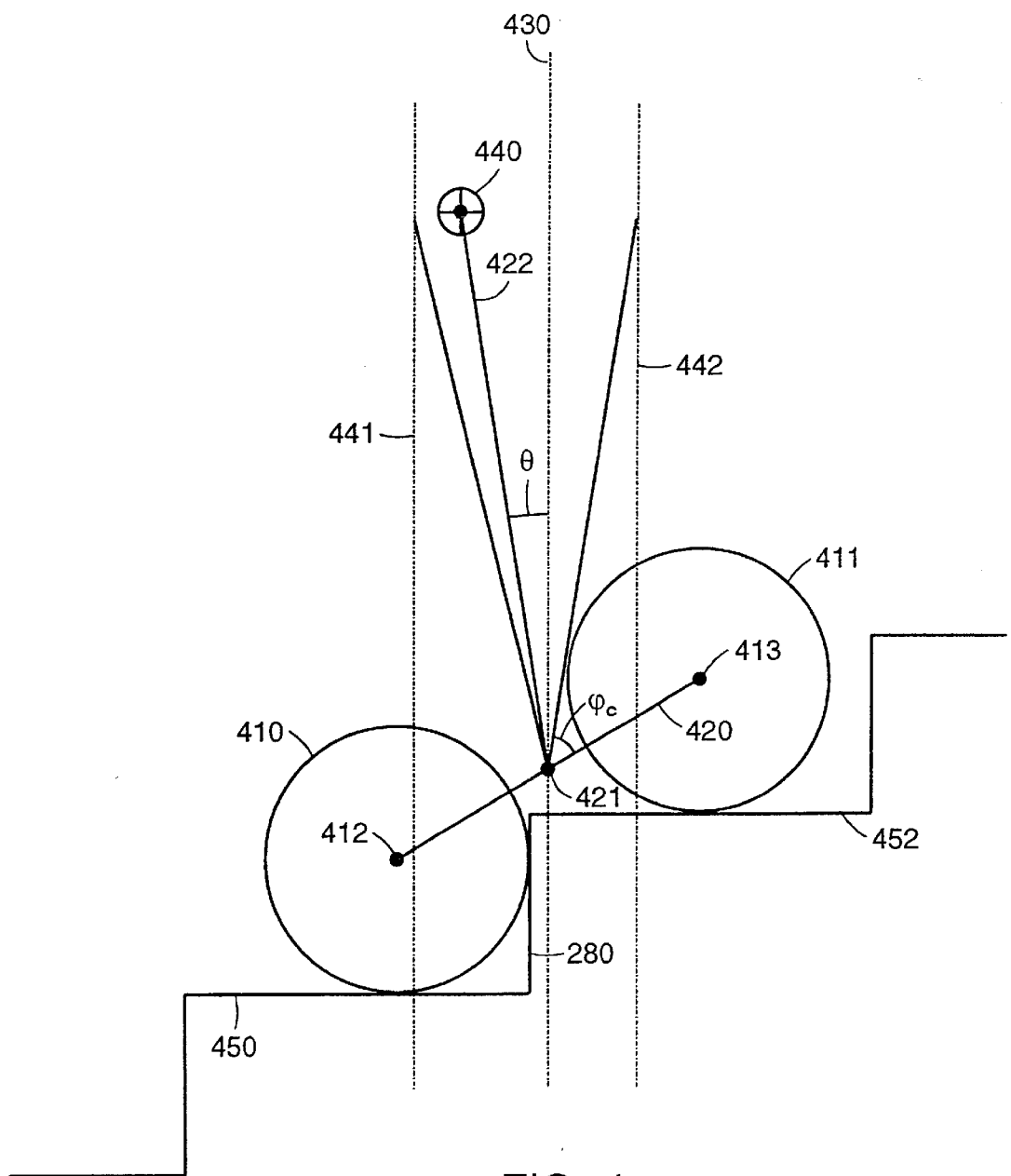
FIG. 4 illustrates the relation between the front and rear angles of the present invention.

The front and rear angles can more easily be understood with reference to FIG. 4 which shows the cluster and wheel configuration and identifies the angles and lengths used in the front and rear angle calculations. FIG. 4 shows the configuration of wheels 410 and 411 of the vehicle as they would be on the staircase with the front wheel 410 on the lower step 450 of the staircase and the rear wheel 411 on the upper step 452 of the staircase. The front and rear wheel centers, 412 and 413, respectively, are rotatably mounted to the cluster arm 420 which rotates, in turn, about the cluster axis 421. A reference vertical 430 passes through the cluster axis 421. The position of the CG 440 of the occupied vehicle is described by the length of a line, $L_1$, 422 from the CG 440 to the cluster axis 421 and by the pitch angle, $\theta$, which is the angle defined by the reference vertical 430 and $L_1$ 422. The cluster position, $\phi_c$ is angle defined by the reference vertical 430 and the cluster arm 420. The sign convention for angles with respect to the reference vertical is positive for counter-clockwise rotation. A specified front vertical 441 intersects a line defined by the cluster arm 420 and defines $X_{front}$ as the horizontal distance between the cluster axis 421 and the intersection point of the front vertical 441 with the cluster arm 420. Siflarly, $X_{rear}$ is the horizontal distance between the cluster axis 421 and the intersection of a specified rear vertical 442 and the cluster arm 420. The front angle, $\theta_{front}$, is defined as the pitch angle when the CG 440 is on the front vertical 441. The rear angle, $\theta_{rear}$, is defined as the pitch angle when the CG 440 is on the rear vertical 442.

The OnLanding sub-mode 330 also allows the vehicle to roll freely in either direction. This is implemented by setting the wheel position errors to zero. This allows the rider to position the vehicle against the bottom riser before ascending the stairs or to drive the vehicle off the top landing to begin stair descent.

The rider can vary the vehicle pitch, $\theta$, by pushing or pulling on a nearby object such as a stair railing. As the rider varies $\theta$, the relatively large value of $k_\theta$ produces a non-zero command to the cluster amplifier to drive the cluster, and the cluster begins to rotate as shown in FIG. 2(c). As the cluster rotates, the cluster position, $\delta$, also changes. The controller monitors the cluster position and, when the controller determines that the cluster is no longer in a horizontal orientation, the controller automatically transitions to the sub-mode 'Climbing' 340 (shown in FIG. 3).

Sub-mode Climbing 340 allows the rider to control the cluster motor by varying the vehicle pitch, $\theta$. The cluster control law used in Climbing 340 is similar or identical to the cluster control law used in OnLanding 330.

While the Climbing 340 sub-mode allows the vehicle to roll in the rearward direction, it does not allow rolling in the forward direction. The wheels are prohibited from rolling in the forward direction as a safety measure to prevent the vehicle from accidentally rolling off a step. This function of the Climbing 340 sub-mode is implemented by setting the wheel position gain, $k_{wp}$, to a large value relative to the values of the other wheel gains. The controller also resets the desired wheel position, $\phi_{w\ desired}$ to the sensed wheel position, $\phi_w$, whenever $\phi_{w\ desired} > \phi_w$. This allows the wheel to freely move in the rearward direction but creates a restoring force if the wheel travels in front of $\phi_{w\ desired}$.

The forward motion of the wheel during Climbing 340 is further damped by setting the wheel velocity gain, $k_{wd}$, to a large positive value when wheel velocity, $\phi_w$ is positive (resulting in a negative $\phi'_w$). This combination of a large positive gain multiplied by a negative wheel velocity error produces a large damping effect in the wheel control law that results in the deceleration of the wheel in the forward direction. A negative wheel velocity corresponds to motion that would drive the wheel into the stair riser 280. In such a situation $k_{wd}$ is set to a large negative value. This causes the wheel control law to accelerate the wheel into the stair riser 280. The controller monitors the state of $\phi_w$ and loads the appropriate $k_{wd}$ into the control law when $\phi_w = 0$ resulting in no discontinuity in the motion of the vehicle when the new gains are loaded into the wheel control law. The rearward acceleration of the wheel into the stair riser has an additional benefit to the rider during stair ascent when the rear wheel is on the top landing. Without rearward acceleration, the rider may have difficulty rolling the wheels backward onto the landing. With rearward acceleration, the controller accelerates the rear wheel backward to find the next stair riser. Since the rear wheel is on the top landing which has no stair riser, the controller continues to accelerate the rear wheel backward. The controller is simultaneously commanding the cluster motor to place the CG in a stable configuration directly over the cluster axis 421. The simultaneous and independent operation of wheel and cluster control laws appears to the rider as the vehicle moving rearward while the cluster rotates just enough to bring the front wheel level with the top landing.

In order to prevent the vehicle from accelerating backward into a object on the top landing, the controller monitors the wheel position, $\phi_w$. When the rear wheel has moved no more than one wheelbase length (the distance between centers 412 and 413) rearward on the landing, the controller can safely assume that the front wheel is over the top landing and automatically transitions to sub-mode OnLanding 330.

The wheel control law for the Climbing 340 sub-mode also uses the pitch state information to accomplish the second objective of the sub-mode by using relatively large values for the wheel pitch gains, $k_{w\theta}$ and $k_{w\theta r}$. The signs of the pitch terms in equation (1) are changed to ensure that the wheel rotation is always in the rearward direction. In the case of the pitch rate term, the absolute value of the pitch rate is taken and the sign is negative to ensure that regardless of the pitch rotation direction, the command to the wheel will always be in a rearward direction. Similarly, the rear pitch error is subtracted from the front pitch error.

As the cluster rotates the front wheel to the next step during ascent or rotates the rear wheel to the next step during descent, the front and rear angles are recalculated by the controller. As the rotating wheel (the front wheel during ascent or the rear wheel during descent) approaches the next step, the CG will move in front of the rear angle during ascent or behind the front angle during descent and the controller will automatically transition to sub-mode Transfer 350 shown in FIG. 3.

The Transfer 350 sub-mode, allows the rider to pause on each step and transfer the CG to the rear of $\theta_{rear}$ if the rider desires to continue ascending or in front of $\theta_{front}$ if the rider desires to descend the stairs. Transfer 350 sub-mode allows the rider to shift the CG by pushing or pulling on the stair railing. Additionally, Transfer 350 sub-mode allows the vehicle to roll in the rearward direction but not in the forward direction, as implemented by the same wheel control law as used in the Climbing 340 sub-mode.

In order to allow the rider to pause on each step and transfer the CG to the rear of $\theta_{rear}$ if the rider desires to continue ascending or in front of $\theta_{front}$ if the rider desires to descend the stairs, the cluster is driven according to the control law $$V_c = k\theta' \quad (5)$$

whenever $\theta_{front} > \theta > \theta_{rear}$. The gain, k, for this sub-mode is set sufficiently low to allow the rider to shift the vehicle CG between the front and rear angles using moderate force on the stair handrails. The low value for k appears to the rider as a soft region where the rider can easily shift the CG between the front and rear angles.

While in the Transfer 350 sub-mode, the controller checks the cluster position. If the vehicle is on the stair case, the cluster position will not be horizontal because the front wheel will be on a different step from the rear wheel. If the controller detects that the cluster position is in a horizontal orientation, the controller assumes that the vehicle is on either the top or bottom landing and automatically transitions to the OnLanding 330 sub-mode.

Figure 5A:
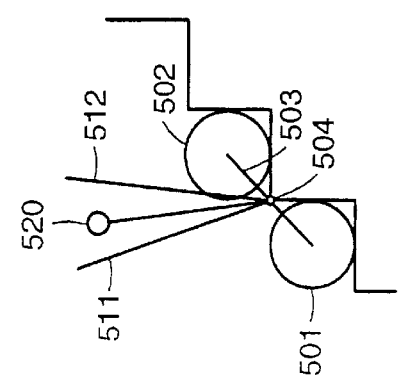
FIGS. 5a–5h illustrate the front and rear angle over one stair climb cycle.

In order to make the vehicle responsive to rider leaning, the front and rear angles are recalculated by the controller during stair climbing. This is more easily understood with reference to FIG. 5. In FIG. 5, wheels 501 and 502 of the vehicle are shown during the ascent of a single stair. FIG. 5a shows a representation of the vehicle with the front wheel 501 on the lower step and the rear wheel 502 on the upper step. The wheels are attached to the cluster arm 503 which rotates about cluster axis 504. The front angle, $\theta_{front}$, is defined by a first line 511 and a vertical reference, not shown, passing through the cluster axis 504. The rear angle, $\theta_{rear}$, is defined by a second line 512 and a vertical reference. In FIG. 5a, the vehicle is in the Transfer 350 sub-mode with the CG 520 of the occupied vehicle between $\theta_{front}$ and $\theta_{rear}$ and the cluster arm 503 in a non-horizontal position. While in Transfer 350 sub-mode, the rider can easily shift the CG 520 of the vehicle to the configuration shown in FIG. 5b where the pitch, $\theta$, is equal to $\theta_{rear}$. The rider can easily shift the CG 520 because the cluster control law for the Transfer 350 sub-mode shown in equation (5) above has a relatively small value for the pitch error gain, k.

Figure 5B:
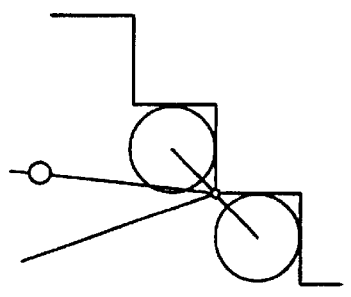
Figure 5C:
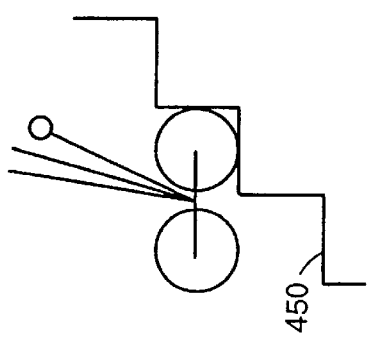
Figure 5D:
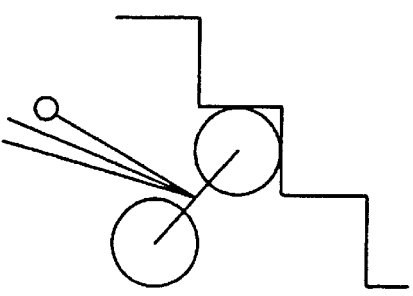
Figure 5E:
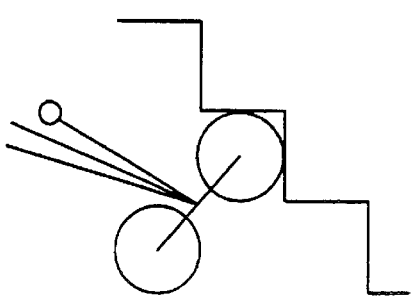
Figure 5F:
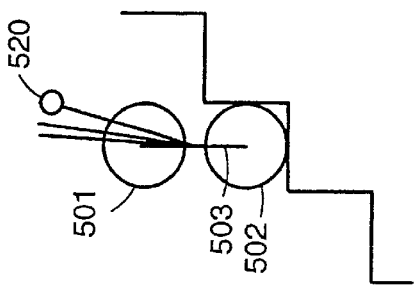
Figure 5G:
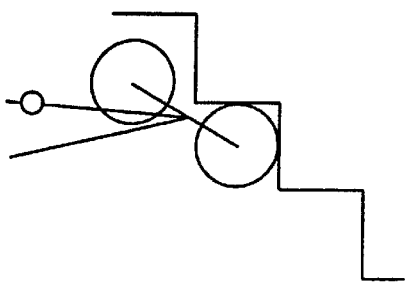
Figure 5H:
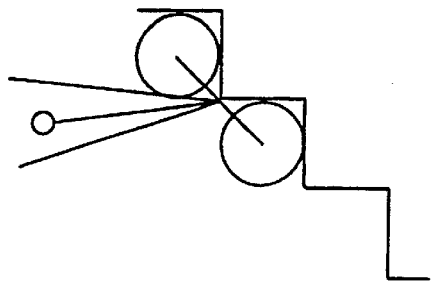

In FIG. 5(b), $\theta = \theta_{rear}$ and the controller automatically transitions to the Climbing 340 sub-mode. As the rider shifts the CG 520 behind $\theta_{rear}$ as shown in FIG. 5c, the controller rotates the cluster arm 503 and lifts the front wheel 501 off the lower step. As shown in FIGS. 5(a)–(h), the $\theta_{front}$ and $\theta_{rear}$ ; change as the cluster arm 503 rotates. In particular, during the rotation phase where the vehicle is supported only by the rear wheels as shown in FIGS. 5(c) through 5(g), the difference between $\theta_{front}$ and $\theta_{rear}$ is small to minimize the time spent in Transfer 350 sub-mode should the rider decide to reverse the direction of stair climbing during cluster arm 503 rotation. FIG. 5(f) shows that cluster arm 503 has rotated to a vertical position placing the front wheel 501 over the rear wheel 502. Since the CG 520 is still behind $\theta_{rear}$, the controller continues to rotate the cluster arm 503. As the cluster arm 503 rotates, the controller calculates new values of the front and rear angles and a configuration shown in FIG. 5(g) is reached where the constantly updated front and rear angles expand to a point where $\theta = \theta_{rear}$. When the pitch equals the rear angle, the controller automatically transitions to the Transfer 350 sub-mode.

FIG. 5(g) shows the configuration of the vehicle at the end of one stair climb cycle where the front wheel has been rotated to the next step to become the rear wheel for the next cycle.

The selection of the front and rear wheel functions used to calculate the front and rear wheel angles are chosen to optimize rider comfort and safety during stair climbing. In a preferred embodiment, the front and rear angles are customized to the rider and depend on the cluster position, $\phi_c$. Using a small angle approximation, the front and rear angles may be calculated by the equations below.

$$\theta_{front} = (1/L_1)X_{front}(\phi_c) + \theta_{ref} \quad (6)$$

$$\theta_{rear} = (1/L_1)X_{rear}(\phi_c) + \theta_{ref} \quad (7)$$

Figure 6:
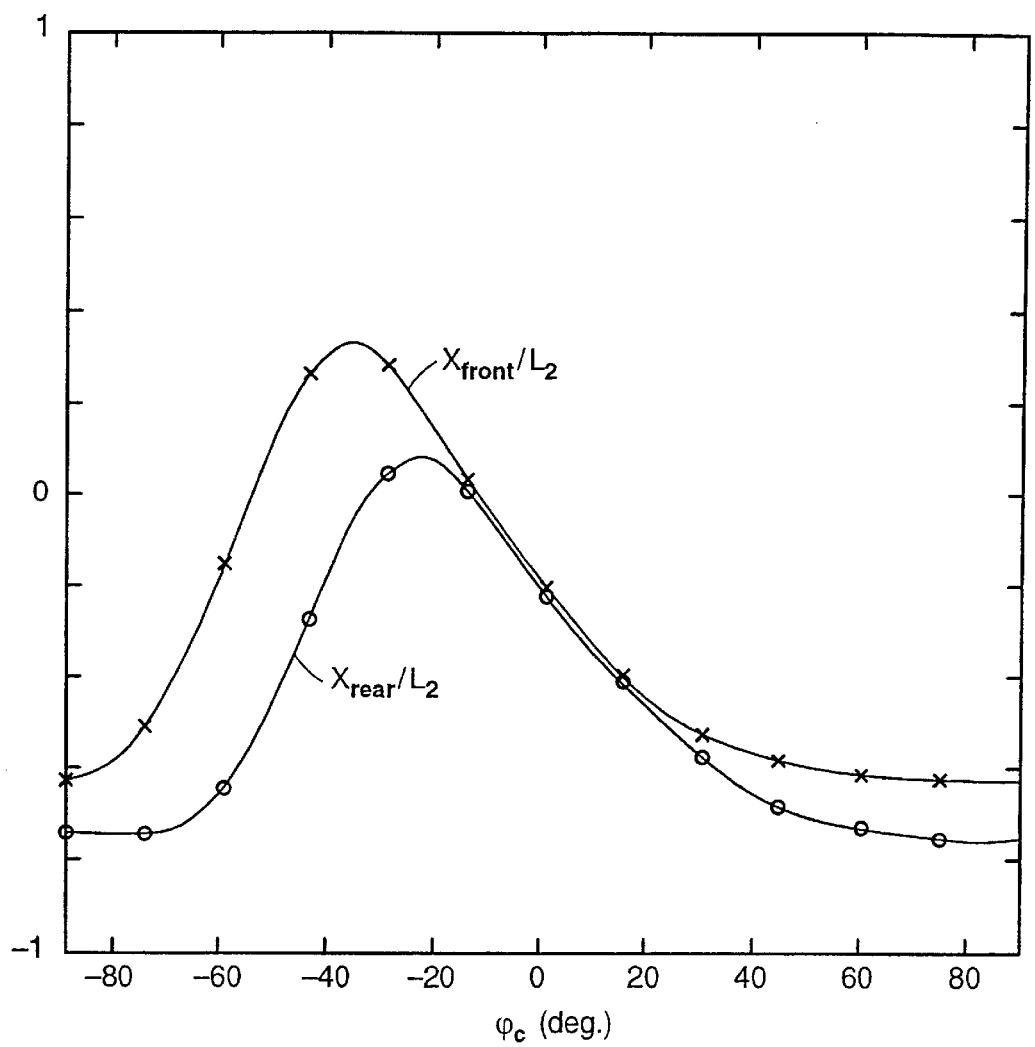
FIG. 6 provides a plot of functions used in the specification of front and rear angles in accordance with embodiments of the present invention.

In the equations above, the quantities $(1/L_1)$ and $\theta_{ref}$ are constants determined during rider customization as described in U.S. pending application Ser. No. 09/321,401. The functions $X_{front}$ and $X_{rear}$ both are functions of $\phi_c$ and may be determined heuristically. In particular, the functional relationships between $X_{front}$ and $X_{rear}$, each, respectively, as functions of $\phi_c$, are plotted in FIG. 6 in accordance with an embodiment of the invention, each normalized in terms of $L_2$, the distance between the wheel axes of each cluster.

Figure 7:
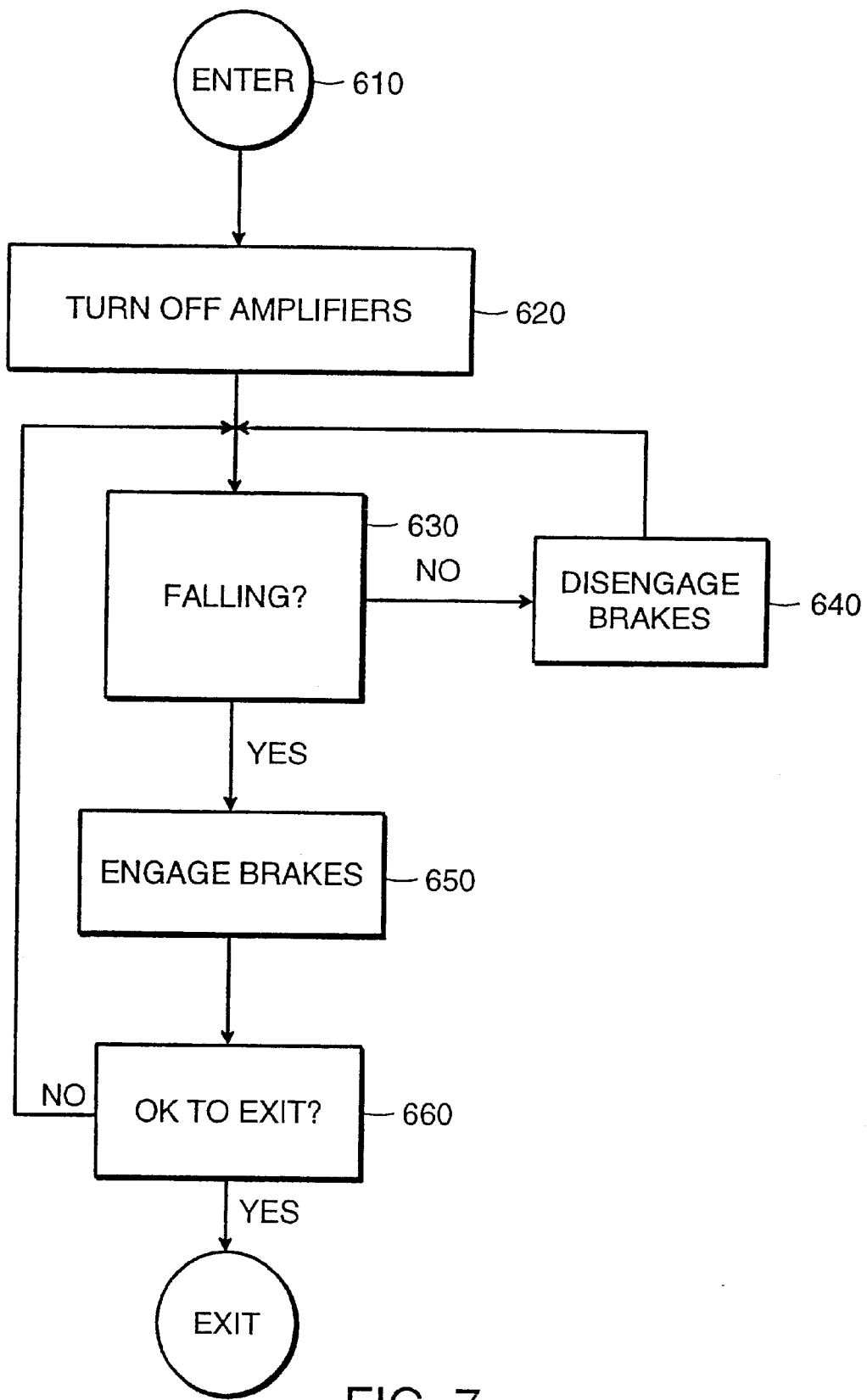
FIG. 7 shows a schematic block diagram of the brake pitch controller.

During stair climbing, the vehicle is supported by only the rear set of wheels during cluster arm 503 rotation as shown in FIGS. 5(c) through (g). Stability is maintained by the rider holding onto a stair handrail. A safety system for automatically placing the vehicle in a statically stable configuration, as shown in FIG. 5(a), in the event of a system fault is now described. The brake pitch controller may be more easily understood with reference to FIG. 7 showing a block schematic of the brake pitch controller. During stair climbing, the controller monitors the cluster motor temperature and battery temperature. If the controller detects overheating in the cluster motor or battery, the controller automatically invokes a brake pitch controller, entered in the step shown as 610 in FIG. 7. The brake pitch controller brings the vehicle into a statically stable configuration. In step 620, the controller turns off the cluster motor amplifier that drives the cluster motor. The amplifier is turned off to allow the cluster motor to cool down. The controller then checks for a falling condition in 630. If a falling condition is not declared, thecontroller disengages the cluster brakes in 640 and rechecks for a falling condition. Disengaging the cluster brakes allows the cluster arm 503 (shown in FIG. 5) to rotate freely and to place front wheel 501 onto a step. If a falling condition is declared, the controller engages the cluster brakes in 650. After engaging the brakes in 650, the controller checks if the over-temperature condition still exists in 660. If the over-temperature condition has passed, the controller exits the brake pitch controller in 670. If the over-temperature condition still exists, the controller rechecks for a falling condition in 630. A falling condition may be declared using state-based criteria alone or in combination with each other. In one embodiment, the controller compares the absolute value of the cluster rotation rate, $\phi_c$, to a preset maximum cluster rotation rate, $\phi_{c\ max}$. If the absolute value of $\phi_c$ is greater than $\phi_{c\ max}$, the controller assumes the vehicle is falling and declares a falling condition. In another embodiment, the pitch rate $\theta$ is compared to a preset falling pitch rate, $\theta_{fall}$. If $\theta$ is less than $\theta_{fall}$, the controller declares a falling condition corresponding to a situation where the vehicle is falling backwards onto the stairs.

In another embodiment, the controller declares a falling condition when $\theta'_{rear}$ is less than zero corresponding to the situation where the CG of the occupied vehicle is behind the rear angle, $\theta_{rear}$. The choice of values of $\phi_{c\ max}$ and $\theta_{fall}$ is within ordinary skill in the control arts.

In an alternate embodiment of the brake pitch controller, the cluster motor amplifier may continue to drive the cluster motor but the load placed on the cluster motor is limited. The cluster motor experiences the largest load when rotating the cluster to ascend the stairs. During stair descent, the motor experiences a much smaller load because the direction of travel of the vehicle is in the same direction as the force of gravity. Therefore, the load on the cluster motor can be limited by prohibiting stair ascent when a motor or battery over-temperature is detected. In an embodiment of the brake pitch controller, the cluster brake is engaged if $\theta<0°$ when a motor or battery over-temperature is detected. In a further embodiment of the brake pitch controller, if a motor or battery over-temperature is detected and $\theta<0°$, the cluster position and rate error variables, $\delta'$ and $\delta'$ are reset to zero, $\delta_{desired}$ is set to zero, and $\delta_{desired}$ is set to $\delta_0$, where $\delta_0$ is the value of $\delta$ at the time that the over-temperature and the $\theta<0°$ condition occurred. The effect of the reset is effectively to lock the cluster if the rider tries to continue ascending stairs when an over-temperature is detected while still allowing the rider to descend the stairs. Additionally, the reset effectively locks the cluster without the delay incurred when physically locking the cluster brake.

Having thus described various illustrative embodiments of the present invention, some of its advantages and optional features, it will be apparent that such embodiments are presented by way of example only and are not by way of limitation. Those skilled in the art could readily devise alternations and improvements on these embodiments, as well as additional embodiments, without departing from the spirit and scope of the invention. For example, though the wheels are connected to a single linear cluster arm, the cluster arm may be angled to accommodate more than two wheels in a cluster. In addition, the cluster arm may be separated into two or more cluster arms, each with only a single wheel wherein the cluster axes may or may not be co-incident. Accordingly, the invention is limited only as defined in the following claims and equivalents thereto.

We claim:

1. A mechanism for restoring static stability to a transport device for climbing or descending stairs, the transport device being characterized by a a pitch and having a cluster arm, a cluster arm actuator characterized by a temperature for driving the cluster arm in rotation, and a brake capable of braking the cluster arm, the mechanism comprising:

a. a controller for detecting over temperature condition and limiting the a sensor for monitoring the temperature of the cluster arm actuator and providing a sensor signal; and b. a controller for monitoring the sensor signal and disengaging the brake when the sensor signal exceeds a preset threshold so as to allow the cluster arm to rotate freely in such a manner that the device assumes a statically stable configuration on the stairs.

2. A mechanism for limiting a load driven by an actuator that drives a transport device in ascent and descent on stairs, the actuator characterized by a temperature, the mechanism comprising:

a. a temperature sensor for monitoring the temperature of the actuator;

b. a controller for detecting an over-temperature condition and limiting the cluster actuator load if by allowing cluster rotation only in the direction of descent for the duration, of the over-temperature condition.

* * * * *